Dec. 29, 1970     TOYOJU MOCHINZUKI ET AL     3,550,377
INTENSIFIER FOR DUAL SYSTEM POWER BRAKES
Filed Feb. 17, 1969
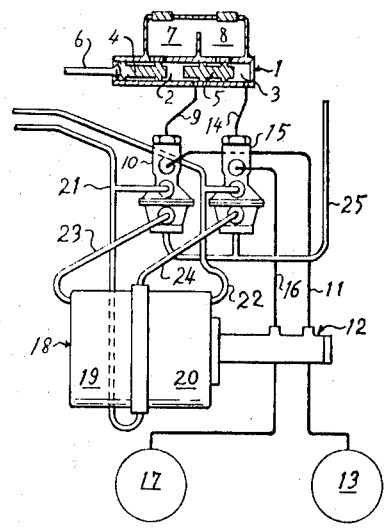
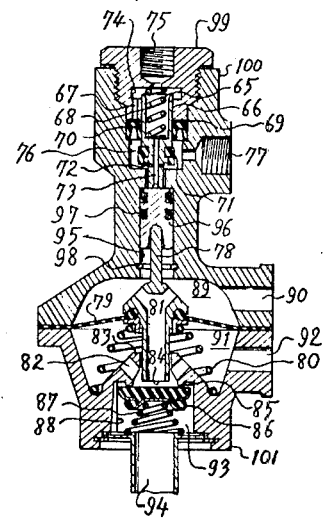
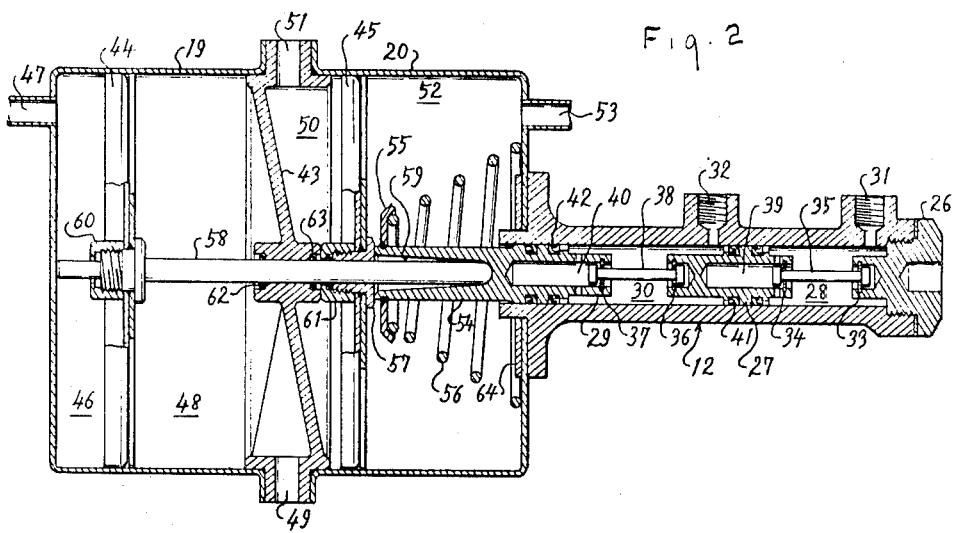

3,550,377
INTENSIFIER FOR DUAL SYSTEM POWER BRAKES
Toyoju Mochinzuki, 5–10, 7-chome Roppongi Minatoku, and Mamoru Watanabe, 16, 6-chome Takinogawa Kitaku, both of Tokyo, Japan
Filed Feb. 17, 1969, Ser. No. 799,732
Claims priority, application Japan, Feb. 15, 1968, 43/9,124
Int. Cl. F15b 7/08, 11/00
U.S. Cl. 60—54.5      9 Claims

ABSTRACT OF THE DISCLOSURE

An intensifier for dual system power brakes is provided which comprises an intensifying cylinder composed of two intensifying pistons and two intensifying chambers, and a servo-motor consisting of two servo-units arranged in series, the servo-units having reciprocatable members, each engaged with an intensifying piston extension in such a manner that the reciprocatable members can move independently of each other to drive the intensifying pistons through operating strokes. One of the intensifying pistons is floating and has resetting positions in the forward and backward directions preset by engageable restrictive linkages, and the main intensifying piston has an effective diameter not less than that of said floating intensifying piston.

BRIEF SUMMARY OF THE INVENTION

This invention relates to an intensifier for dual system power brakes particularly adapted for use for automobiles.

It has been proposed heretofore that the intensifying cylinder, in dual system brake intensifiers, be provided with servo motors at both ends and the servo-pistons of the servo-motors be connected respectively to intensifying pistons provided at both ends of the intensifying cylinder. Thus the direction in which a servo-piston in an intensifying operation pushes the associated intensifying piston is opposite the direction in which the other servo-piston urges the other intensifying piston. The pushing forces of the two servo-pistons therefore offset each other in the floating piston disposed in the middle of the intensifying cylinder, thus failing to achieve the pressure intensifying effect satisfactorily. Another disadvantage of said prior proposed arrangement is that, even if trouble, such as fluid leakage, takes place in one system, the same fluid pressure as if the above system is in normal condition is applied fully to the wheel brakes of the other sound system, and hence a brake lock is likely to occur.

It is a principal object of the present invention, to provide an intensifier for dual system power brakes which normally displays an excellent power brake effect and which, in case of any trouble of either system, can reduce the pressure intensifying effect in half so as to permit stabilized braking and avoid the possibility of brake lock.

A further object of the invention is to provide an intensifier for dual system power brakes which not only achieve the principal object given above but which, when the servo-motor fails to function and either system is inoperative, is also capable of transmitting the fluid pressure of the sound system from the master cylinder directly to the wheel brake assemblies of the vehicle.

According to the present invention, primary and secondary servo-units are serially provided in a single servo-motor and primary and secondary reciprocatable members are so located as to move along a common axis. The combined pushing force applicable to the intensifying pistons is therefore double that of said prior proposed arrangement, and thus an excellent power brake effect is obtained. Moreover, because the reciprocating members are engaged with an intensifying piston extension in such a way that either member can push the extension independently of the function of the other member, there is no possibility of the reciprocating member of an inoperative system following the movement of the other member of the normal system and hence no danger of interrupting the pressure intensifying action of the sound system. Also, in case of inoperation of either system, the intensifying action is reduced to half, whereby stabilized braking control is accomplished without any danger of brake lock.

In addition to the above, there are provided in accordance with the present invention a primary linkage for restricting the backward position of the primary intensifying piston and a secondary linkage for limiting the distance between the primary and secondary intensifying pistons and further, the effective diameter of the secondary intensifying piston is made at least as great as that of the primary intensifying piston. With such an arrangement, it is possible, when the servo-motor is inoperative and either system has gone out of order, to transmit the fluid pressure of the master cylinder directly to the wheel brakes on the normal side without any waste or loss and thereby to secure a minimum of braking force.

BRIEF DESCRIPTION OF THE DRAWINGS

FIG. 1 is a schematic view, partly in section, of an automobile brake incorporating an intensifier for a dual system power brake according to the present invention;

FIG. 2 is a sectional view of a form of a dual system brake intensifier embodying the invention; and FIG. 3 is a sectional view of a valve assembly including a hydraulic control valve and an atmospheric control valve.

DETAILED DESCRIPTION

The present invention will now be described in further detail with reference to the accompanying drawing showing an embodiment thereof. Referring specifically to FIG. 1 in which an intensifier for dual system power brake according to the invention is illustrated as incorporated in a brake for vehicles, 1 is a dual master cylinder consisting of a primary hydraulic chamber 2, a secondary hydraulic chamber 3, a primary piston 4 and a secondary piston 5, the piston 4 being connected to a push rod 6. Primary hydraulic chamber 2 communicates with a primary reservoir 7, and secondary hydraulic chamber 3 with a secondary reservoir 8. Fluid pressure produced in the primary hydraulic chamber 2 is transmitted to a primary valve assembly 10 via a low-pressure line 9, and then to an intensifying cylinder 12 through a high-pressure line 11. The fluid intensified in pressure by the intensifying cylinder 12 is then led through high-pressure line 11 to a primary wheel brake assembly 13. The circuit above described constitutes a hydraulic system. The other hydraulic system is formed by a circuit consisting of the second hydraulic chamber 3, a low-pressure line 14, a secondary valve assembly 15, a high-pressure line 16, intensifying cylinder 12, and a secondary wheel brake assembly 17, all connected in series in the order mentioned. Construction of valve assemblies 10, 15 will be described in detail later. Connected to intensifying cylinder 12 is a dual servo-motor 18 which will be described later in conjunction with FIG. 2. Servo-motor 18 is divided into a primary servo-unit 19 and a secondary servo-unit 20, which are in communication through vacuum hoses 21, 22 with valve assemblies 10, 15, respectively, and a common vacuum source such as a vacuum pump (not shown), and the units 19 and 20 are also in communication, through vacuum/air hoses 23, 24, with valve assemblies 10, 15 and farther through air hose 25 to atmosphere.

In FIG. 2 there is shown more fully a dual system brake intensifier embodying the present invention.

Inside the intensifying cylinder 12 is an end plug 26 which constitutes an end wall of the cylinder and defines with a primary intensifying piston 27 a primary intensifying chamber 28 therebetween. The same primary intensifying piston 27 and a secondary intensifying piston 29 define a secondary intensifying chamber 30 therebetween. At a connection port 31 of primary intensifying chamber 28 is connected high-pressure line 11 (FIG. 1), and at connection port 32 of secondary intensifying chamber 30 is connected high-pressure line 16. End plug 26 and primary intensifying piston 27 are coupled together by means of stoppers 33, 34 and a pin 35 so that the backward position of primary intensifying piston 27 is limited. Similarly, primary intensifying piston 27 and secondary intensifying piston 29 are coupled together by stoppers 36, 37 and a pin 38 to limit the distance between the primary and secondary intensifying pistons 27, 29. Stoppers 33, 34 and pin 35 constitute a primary linkage according to the present invention, and likewise stoppers 36, 37 and pin 38 constitute a secondary linkage. As the primary linkage, the combination of stoppers 33, 34 and pin 35 may be replaced by a piston stopper protruding inwardly from the inner wall of the cylinder. Intensifying pistons 27, 29 are formed with bores 39, 40 for receiving pins 35, 38, respectively, in the compression stroke, and are also provided with seals 41, 42. In the embodiment shown, the effective diameter of primary intensifying piston 27 is equal to that of secondary intensifying piston 29.

Servo-motor 18 is divided by a partition wall 43 into two units, i.e., first servo-unit 19 and second servo-unit 20, which respectively accommodate a primary reciprocating member 44 and a secondary reciprocating member 45. The atmospheric pressure chamber 46 of primary servo-unit 19 is connected at 47 to vacuum/air hose 23, and the vacuum chamber 48 is connected at 49 to vacuum hose 21. In like manner the atmospheric pressure chamber 50 of secondary servo-unit 20 is connected at 51 to vacuum/air hose 24, and the vacuum chamber 52 is connected at 53 to vacuum hose 22. Inside the last-mentioned vacuum chamber 52, an intensifying piston extension 54 formed integrally with secondary intensifying piston 29 of intensifying cylinder 12 is located along the common axis of operation for primary reciprocating member 44 and secondary reciprocating member 45. This intensifying piston extension 54 need not be formed integrally with secondary intensifying piston 29 but may be secured thereto for interlocked operation. A return spring 56 is provided between a stopper 55 fixedly secured to extension 54 and the end wall of secondary servo-unit 20. Accordingly, intensifying cylinder 12 need not be provided with any return spring. In the center of secondary reciprocating member 45 is a pressure collar 57 in contact with intensifying piston extension 54. A push rod 58 fixed at one end to the center of primary reciprocating member 44 extends slidably through partition wall 43 and pressure collar 57 and fits in the bore 59 of intensifying piston extension 54. The construction of the intensifying piston extension 54 is not limited to the one illustrated. For example, push rod 58 may be connected rigidly with intensifying piston extension 54 to form a combined extension, the left end of push rod 58 being simply kept in contact with primary reciprocating member 44. Numerals 60, 61 designate seal nuts, 62, 63 atmospheric seals, and 64 a reinforcing plate.

FIG. 3 shows in section either of valve assemblies 10, 15. The upper half of each valve assembly constitutes a hydraulic control valve, and the lower half serves as an atmospheric control valve. The hydraulic control valve is composed of a valve spring 65, valve cylinder 66, passage 67, valve plunger 68, spacer 69, high-pressure check valve 70, valve 71, passage 72, return port 73, low-pressure chamber 74, low-pressure circuit connection 75, high-pressure chamber 76 and high-pressure circuit connection 77. The atmospheric control valve has a valve rod 78, diaphragm 79, diaphragm spring 80, atmospheric ports 81, 82, guide 83, poppet pusher 84, seat face 85, poppet valve 86, valve spring 87, poppet guide face 88, vacuum chamber 89, port 90 for connection with vacuum hose 21 or 22, chamber 91, port 92 for connection with vacuum/air hose 23 or 24, atmospheric chamber 93 and port 94 for connection with air hose 25. The hydraulic and atmospheric control valves are interlocked by a relay cylinder 95. Other components of the assembly are a relay piston 96, seal 97, stopper 98, plug 99, valve assembly body 100 and housing 101.

The operation of the apparatus is as follows:

When both systems are sound, fluid under pressure is supplied by master cylinder 1 to the low-pressure chambers 74 of valve assemblies 10, 15, via low-pressure lines 9, 14, respectively. In each valve assembly, valve plunger 68 is thereby caused to descend and urge relay piston 96 to depress valve rod 78. Consequently, poppet pusher 84 is urged into close contact with poppet valve 86 to close atmospheric port 81 and then push poppet valve 86 downwardly away from seal face 85, so that the atmospheric chamber 93 and chamber 91 are in communication through atmospheric port 82. Atmospheric chambers 46 and 50 of servo-motor are thus maintained at atmospheric pressure, while vacuum chambers 48 and 52 are evacuated. The pressure difference causes primary and secondary reciprocating members 44, 45 to undergo a compression stroke (to the right in FIG. 2). Push rod 58 fixed to primary reciprocating member 44 pushes intensifying piston extension 54, and pressure collar 57 secured to secondary reciprocating member also pushes the intensifying piston extension 54, with the result that secondary intensifying piston 29 is forced forward (to the right in FIG. 2) to increase the fluid pressure in secondary intensifying chamber 30. At the same time, primary intensifying piston 27 also advances to the right to raise the pressure inside primary intensifying chamber 28. The fluid pressures built up to this way are transmitted to wheel brake assemblies 13, 17, respectively, by way of high-pressure lines 11, 16. The rise of fluid pressure within intensifying cylinder 12 is accompanied by increases in the pressures in high-pressure chambers 76 of valve assemblies 10, 15. But, because valve 71 in each assembly is held in close contact with the wall of high-pressure chamber 76 to shut off its communication with low-pressure chamber 74 via pasage 72 and also because high-pressure check valve 69 keeps the high-pressure chamber 76 out of communication with the low-pressure chamber 74 through passage 67, the high-pressure circuit is completely isolated from the low-pressure circuit.

In the event of any trouble, such as for example fluid leakage, in the system involving the secondary wheel brake assembly 17, the intensifier according to the invention operates in the following way. Since both the hydraulic and atmospheric control valves of secondary valve assembly 15 do not function, secondary reciprocating member 45 remains inoperative. Meanwhile, the hydraulic and atmospheric control valves of primary valve assembly 10 operate an cause primary reciprocating member 44 to go through its compression stroke. Push rod 58 slides through partition wall 43, atmospheric seal 62, seal nut 43 of secondary reciprocating member 45, atmospheric seal 63 and the bore of pressure collar 57, and thereby pushes intensifying piston extension 54. As a result, secondary intensifying piston 29 advances through a dead stroke until it contacts the left end of primary intensifying piston 27, and then it urges the primary intensifying piston 27 forward (to the right) to increase the fluid pressure in primary intensifying chamber 28. Because secondary reciprocating member 45 remains inoperative, the pressure build-up or intensifying action thus attained is about half that which is achieved when both systems are sound. The increased fluid pressure is transmitted through high-pressure line 11 to primary wheel brake assembly 13.

Lastly, in the event when the primary and secondary reciprocating members 44, 45 have failed to work due to a trouble of the atmospheric system and moreover when either of the hydraulic systems is inoperative, the intensifier of the invention operates as follows. It is assumed, for example, that something has gone wrong with the system involving primary wheel brake assembly 13. Then, the fluid under pressure from secondary hydraulic chamber 3 of master cylinder 1 is led through low-pressure line 14 into low-pressure chamber 74 of secondary valve assembly 15, and thence through the gap between the outer periphery of valve plunger 68 and high-pressure check valve 70 into high-pressure chamber 76, and into secondary intensifying chamber 30 of intensifying cylinder 12 and secondary wheel brake assembly 17. Since the pressure in secondary intensifying chamber 30 is not built up, the fluid pressure in the secondary hydraulic chamber 3 of master cylinder 1 is directly applied to the secondary wheel brake assembly 17, and a minimum braking power is obtained. If in this case, the effective diameter of secondary intensifying piston 29 is less than that of primary intensifying piston 27, the force applicable to the latter piston by virtue of the fluid pressure from master cylinder 1 becomes greater than that applicable to the former piston, and therefore the primary and secondary intensifying pistons 27, 29 will advance together as linked by pin 38, with consequent increase in the waste and loss of fluid pressure supply. For this reason, the effective diameter of secondary intensifying piston 29 should be equal to or larger than that of primary intensifying piston 27.

It should be appreciated that the servo-motor to be used in accordance with the present invention is not limited to piston type but a diaphragm type servo-motor may be employed as well.

What is claimed is:

1. Apparatus for dual system power brakes comprising an intensifying cylinder having an end wall, a primary intensifying piston in said cylinder defining a primary intensifying chamber between said end wall and the primary intensifying piston, a secondary intensifying piston in said cylinder defining a secondary intensifying chamber between said primary intensifying piston and the secondary intensifying piston, a servo-motor located adjacent the secondary intensifying chamber of the intensifying cylinder, means dividing said servo-motor into a primary servo-unit and a secondary servo-unit adapted to be atmospherically controlled by separate atmospheric control valves, reciprocatable members in respective servo-units adapted to reciprocate along a common axis within said units, an intensifying piston extension disposed on the common operating axis for the reciprocating members and coupled with the secondary intensifying piston in the intensifying cylinder and means engaging said reciprocatable members with said intensifying piston extension such that either reciprocating member can push said extension independently of the movement of the other reciprocating member, and further including a dual master cylinder provided with a primary hydraulic chamber and a secondary hydraulic chamber, a primary piston slidably supported in said primary hydraulic chamber, a secondary piston slidably supported in said secondary hydraulic chamber, a primary control valve communicating with said primary hydraulic chamber, and a secondary control valve communicating with said secondary hydraulic chamber, said primary intensifying chamber communicating with said primary control valve, said secondary intensifying chamber communicating with said secondary control valve, said primary and secondary control valves both being constituted of both a hydraulic chamber and an atmospheric chamber separated by a relay piston slidably interposed therebetween, said relay piston in each said primary control valve and secondary control valve being responsive to the hydraulic pressure provided by said primary and secondary hydraulic chambers respectively.

2. Apparatus as claimed in claim 1 including pressure lines communicating said primary and secondary control valves respectively with said primary and secondary hydraulic chambers and respectively with said primary and secondary intensifying chambers.

3. Apparatus as claimed in claim 1 wherein the intensifying cylinder includes a primary linkage for restricting and defining a retracted position of the primary intensifying piston and a secondary linkage for limiting the distance between the primary and secondary intensifying pistons, said secondary intensifying piston in said intensifying cylinder having an effective diameter at least as great as that of the primary intensifying piston.

4. Apparatus as claimed in claim 3 wherein said primary linkage includes a pin slidably engaging said end wall and said primary intensifying piston to permit said primary intensifying piston to approach the end wall without restriction, said pin having enlarged heads limiting the distance that the primary intensifying piston can move away from the end wall.

5. Apparatus as claimed in claim 3 wherein said secondary linkage comprises a pin slidably engaging said primary and secondary intensifying pistons to permit the pistons to approach one another without restriction, said pin having enlarged heads limiting the spacing between the pistons.

6. Apparatus as claimed in claim 1 wherein said extension is integral with said secondary intensifying piston.

7. Apparatus as claimed in claim 1 wherein said means engaging said reciprocating members with said intensifying piston extension comprises a push rod on the reciprocatable member furthest from the piston extension, the other reciprocatable member having an opening through which said push rod extends, said extension having a bore in which said push rod engages and contacts the extension, said other reciprocatable member being in direct contact with said extension.

8. Apparatus as claimed in claim 7 wherein said means engaging the reciprocating members with the intensifying piston extension comprises a collar threadably engaging said other reciprocatable member for contacting the extension, said collar having a bore through which said push rod extends.

9. Apparatus as claimed in claim 1 comprising spring means in said servo-motor acting on said extension to urge the same and the primary and secondary intensifying pistons to an initial, normal position.

References Cited
UNITED STATES PATENTS

| | | | |
|---|---|---|---|
| 2,976,085 | 3/1961 | Grogan | 60—54.6Ex |
| 3,083,694 | 4/1963 | Schanz | 60—54.6Px |
| 3,191,385 | 6/1965 | Watanabe | 60—54.6E |
| 3,195,309 | 7/1965 | Cripe | 60—54.5P |
| 3,173,261 | 3/1965 | Chouings | 60—54.5P |
| 3,196,618 | 7/1965 | Farmery et al. | 60—54.6P |
| 3,216,194 | 11/1965 | Yardley | 60—54.6E |

MARTIN P. SCHWADRON, Primary Examiner

R. R. BUNEVICH, Assistant Examiner

U.S. Cl. X.R.

60—54.6; 91—414; 188—152